(12) United States Patent
Akkar et al.

(10) Patent No.: US 7,774,653 B2
(45) Date of Patent: Aug. 10, 2010

(54) METHOD TO SECURE AN ELECTRONIC ASSEMBLY EXECUTING ANY ALGORITHM AGAINST ATTACKS BY ERROR INTRODUCTION

(75) Inventors: Mehdi-Laurent Akkar, Gentilly (FR); Louis Goubin, Paris (FR); Olivier Thanh-Khiet Ly, Boulogne Billancourt (FR)

(73) Assignee: Gemalto SA, Meudon (FR)

( * ) Notice: Subject to any disclaimer, the term of this patent is extended or adjusted under 35 U.S.C. 154(b) by 1297 days.

(21) Appl. No.: 10/549,793

(22) PCT Filed: Mar. 17, 2004

(86) PCT No.: PCT/IB2004/000776

§ 371 (c)(1),
(2), (4) Date: Sep. 19, 2005

(87) PCT Pub. No.: WO2004/084073

PCT Pub. Date: Sep. 30, 2004

(65) Prior Publication Data

US 2006/0282741 A1    Dec. 14, 2006

(30) Foreign Application Priority Data

Mar. 18, 2003    (EP) .................................. 03290688

(51) Int. Cl.
*G06F 11/00* (2006.01)

(52) U.S. Cl. .............................. 714/38; 714/43; 714/35
(58) Field of Classification Search ........................ None
See application file for complete search history.

(56) References Cited

U.S. PATENT DOCUMENTS

| 5,301,325 | A | * | 4/1994 | Benson ........................ 717/159 |
| 5,450,575 | A | * | 9/1995 | Sites ........................... 717/128 |
| 5,961,636 | A | * | 10/1999 | Brooks et al. ................ 712/228 |
| 6,571,363 | B1 | * | 5/2003 | Steiss .......................... 714/732 |
| 6,622,263 | B1 | * | 9/2003 | Stiffler et al. .................. 714/13 |
| 6,766,471 | B2 | * | 7/2004 | Meth ........................... 714/16 |
| 6,874,138 | B1 | * | 3/2005 | Ziegler et al. ................ 717/127 |
| 7,117,354 | B1 | * | 10/2006 | Browning et al. ............ 713/100 |
| 7,418,630 | B1 | * | 8/2008 | Vick et al. ..................... 714/34 |
| 7,516,361 | B2 | * | 4/2009 | Vick et al. ..................... 714/15 |
| 2002/0147891 | A1 | * | 10/2002 | Saulsbury et al. ............ 711/154 |
| 2004/0034814 | A1 | * | 2/2004 | Thompson ................... 714/35 |
| 2004/0153834 | A1 | * | 8/2004 | Oshima et al. ................ 714/38 |

(Continued)

OTHER PUBLICATIONS

Translation of cited foreign patent EP0606802.*

(Continued)

*Primary Examiner*—Christopher S McCarthy
(74) *Attorney, Agent, or Firm*—Pehr B. Jansson; The Jansson Firm

(57) ABSTRACT

The invention concerns an automatic method to secure an electronic calculation assembly against attacks by error introduction or by radiation. The following are used: 1) Static information generated by the automatic process; 2) A dynamic part of the memory of the electronic system allocated by the automatic process; 3) Beacons and check points to mark out the code, introduced by the automatic process; 4) Beacon functions storing information in the dynamic memory; 5) History verification functions using the static information and the dynamic memory to check that no errors have been introduced.

15 Claims, 2 Drawing Sheets

U.S. PATENT DOCUMENTS

| | | | |
|---|---|---|---|
| 2005/0055605 A1* | 3/2005 | Blumenthal et al. | 714/13 |
| 2005/0114736 A1* | 5/2005 | Larsen | 714/38 |
| 2005/0120191 A1* | 6/2005 | Akkary et al. | 712/217 |
| 2005/0193269 A1* | 9/2005 | Haswell et al. | 714/38 |
| 2006/0009150 A1* | 1/2006 | Leung et al. | 455/3.01 |
| 2008/0276127 A1* | 11/2008 | McFarland et al. | 714/37 |

OTHER PUBLICATIONS

Microsoft Computer Dictionary 4th Edition, 1999, Microsoft Press, p. 84.*

* cited by examiner

METHOD TO SECURE AN ELECTRONIC ASSEMBLY EXECUTING ANY ALGORITHM AGAINST ATTACKS BY ERROR

INTRODUCTION

This invention concerns a method to secure an electronic assembly implementing any algorithm where a check must be carried out to ensure that the algorithm was executed correctly, whether for the intermediate steps of the various functions (execution of code, loops, tests, etc.) or for the calls between functions. More precisely, the purpose of the method is to produce a version of the implementation which is not vulnerable to certain types of attack through introduction of one or more errors—known as Fault Analysis or Extended Fault Analysis—which attempt to obtain information about one or more data items or operations involved in the calculation by studying the calculation procedure of the electronic assembly when one or more errors are introduced.

This invention covers all implementations where it is essential to ensure that all steps involved during the calculation were error-free. The first appearance of such attacks dates back to 1996:

Ref (0): New Threat Model Breaks Crypto Codes—D. Boneh, R. DeMillo, R. Lipton—Bellcore Press Release Another objective of the method is to propose a defence against attacks by radiation, flash, light, laser, glitch or other and more generally against any attack disturbing the execution of the program instructions known as disturbance attack. These attacks modify the instructions to be executed, resulting in non-execution or incorrect execution of certain parts of the program.

The purpose of the method according to this invention is to eliminate the risks of attacks by disturbance or attacks by fault injection on electronic assemblies or systems by modifying the functions involved in the calculation.

The method to secure an electronic assembly implementing a traditional calculation process which must be error free, subject of this invention, is remarkable in that the functions implemented in the calculation are modified by adding in several positions and automatically:

Dynamic memory allocation
Static information.
Check objects called "Beacons" and "Check points".
Calls to "beacon" and "history verification" functions which, in addition, will use the dynamic and static memory.

The method uses the control flow graph of the program to be protected to generate the static information used by the verification functions.

The beacon is information defining the characteristics of the corresponding passage point and/or one or more other passage points.

According to one form of realisation of the invention, the beacon is an integer locating the beacon in the code to be protected.

According to another form of realisation, the beacon is a Boolean variable defining whether it is the first or the last beacon.

According to a special form of the invention, the beacon is a data structure characterising, according to the value of a register or a given variable, all beacons through which passage will be forbidden (using a verification function) in the remaining execution.

According to another special form of realisation of the invention, the beacon is a data structure characterising, according to the value of a register or a given variable, all beacons whose passage will be forced (using a verification function) in the remaining execution.

The forms of realisation mentioned can be combined: the beacon may consist of several of the elements described above.

The beacon and verification functions use a shared area of the system memory.

The shared memory contains a data structure of type stack, of type Boolean array and/or of type number storing a checksum.

A beacon function is one which is called by the program at each passage by a beacon and which consists in storing dynamically in the shared memory various items of information concerning the beacon, and possibly of performing a check on the execution.

According to a special form of realisation of the invention, the beacon function is one which pushes the beacon onto the stack in the shared memory.

According to another form of realisation, the beacon function is one which updates a checksum contained in the shared memory with the beacon data.

Said forms of realisation can be combined.

A history verification function is one called at each check point to check the consistency of the information stored in the shared memory during the successive calls of the beacon functions.

The static memory calculated by the automatic process is a beacon stack list representing a valid beacon passage history and/or a list of checksums obtained from a valid beacon passage history.

With a checksum, the checksum is obtained by using the add function, by using the Exclusive Or (XOR) function, by using an ordinary checksum and/or by using a hashing cryptographic function.

The "Beacon" and "Check point" objects, the "Beacon Function" and "History Verification Functions" as well as the shared memory will be described generically below and examples will also be given.

BRIEF DESCRIPTION OF THE DRAWINGS

Other purposes, features and advantages of the invention will appear on reading the description which follows of the implementation of the method according to the invention and of a mode of realisation of an electronic assembly designed for this implementation, given as a non-limiting example, and referring to the attached drawings in which.

WAY OF REALISING THE INVENTION

The purpose of the method according to the invention is to secure an electronic assembly and for example an onboard system such as a smart card implementing a program. The electronic assembly comprises at least a processor and a memory. The program to be secured is installed in the memory, for example ROM type, of said assembly.

Figure 1:
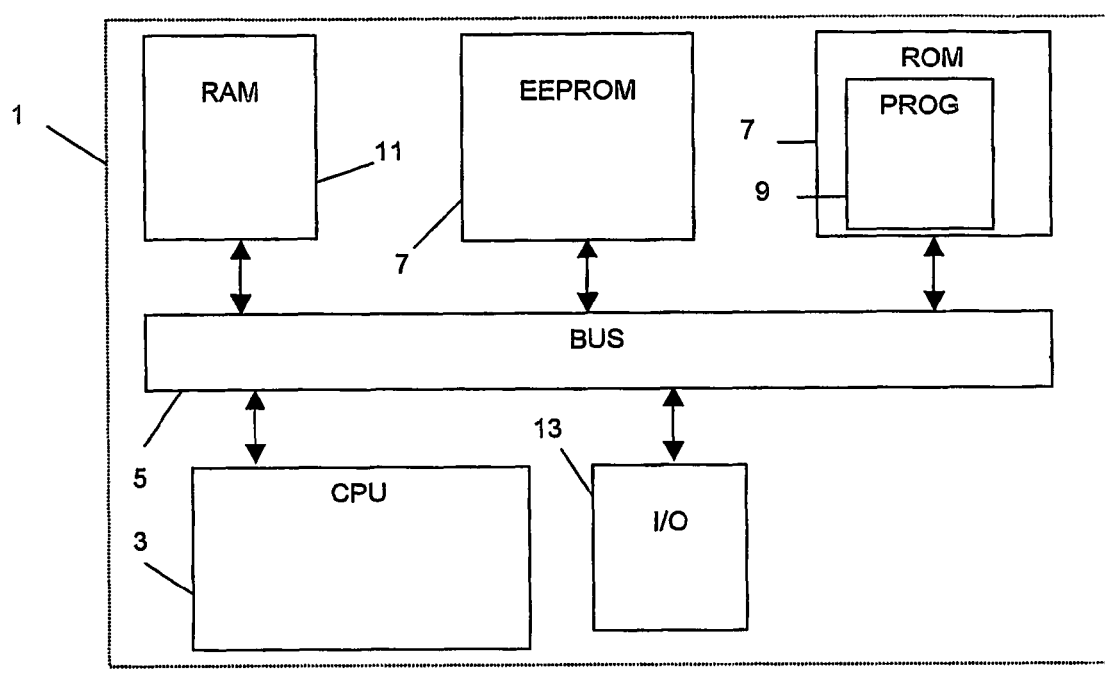
FIG. 1 is a diagrammatic representation of a mode of realisation of an electronic module according to this invention.

As a non-limiting example, the electronic-assembly described below corresponds to an onboard system comprising an electronic module 1 illustrated on FIG. 1. This type of module is generally realised as a monolithic integrated electronic microcircuit, or chip, which once physically protected by any known means can be assembled on a portable object such as for example a smart card, integrated circuit card or other card which can be used in various fields.

The microprocessor electronic module 1 comprises a microprocessor CPU 3 with a two-way connection via an internal bus 5 to a non volatile memory 7 of type ROM, EEPROM, Flash, FeRam or other containing the program PROG 9 to be executed, a volatile memory 11 of type RAM, input/output means I/O 13 to communicate with the exterior.

1. Principle 1.1 Beacons and Beacon Function

Definition

A beacon will be an item of information which will define the characteristics of the passage point.

A beacon function will be one which will be called by the program at each passage by a beacon and which will consist in storing in the shared memory various items of information concerning the beacon, and possibly of performing a check on the execution.

EXAMPLES

A beacon could be, for example:

An integer used to find the location of said beacon or a Boolean variable defining whether it is the first or the last beacon for example.

A complex structure describing a set of information concerning the current state of the electronic device executing the code. For example, a data structure characterising, according to the value of a register or a given variable, all beacons through which passage will be forbidden (using the beacon function or the verification function) in the remaining execution.

A beacon function could, for example, perform the following operations:

See whether the beacon is the first beacon (using a field specific to the beacon). If yes, create an empty stack in shared memory, push the beacon onto the stack and continue the code, otherwise push the beacon onto the stack and continue executing the code.

1.2 Check Points, History Verification

Definition

A check point will be a data structure containing information which will be used by the history verification function.

The history verification function is one called at each check point to check the consistency of the information stored in the shared memory during the successive calls of the beacon functions.

EXAMPLES

A check point may consist of all lists of beacons corresponding to authorised executions leading to this check point.

The verification function could be the check that the stack of beacons crossed corresponds to one of the lists of the check point. Otherwise, an error is detected.

2. Form of Realisation

We will now describe as an example the operation of a C code preprocessor which implants the error detection semi-automatically.

The C source code is input to the preprocessor which converts this code to include the error detection.

This conversion is guided by the directives included in the code and which specify the beacons which must be introduced. These directives may take the following forms:

1. start: this directive specifies that the stack of beacons crossed successively must be emptied.
2. flag: this directive specifies the introduction of a new beacon which must be pushed onto the stack at each passage.
3. verify: this directive specifies the introduction of a check point which will perform, whenever it is crossed, a check that all beacons stacked correspond to permissible execution.
4. race n cond: this directive specifies the introduction of a beacon which indicates when it is crossed that if the Boolean expression cond is true, then only the executions in family n are permissible. This type of family is defined by all directives of the following type.
5. flag ln1 . . . lnk m1 . . . mk: this directive specifies that the executions of families n1 . . . nk must not pass by this point and that the executions of families m1 . . . mk must pass by this point.
6. Loop n: this directive specifies the entry into a loop to be repeated n times.

An example will now be given in language C including directives intended for the preprocessor. Function int f(int x, int d) performs action1($d$) three times, then action2($d$) if x is equal to 1. Function action2(int d) performs action21($d$) then action22($d$).

The directives are placed in the code as #pragma. Their effects are indicated in comments.

```
int f (int x,int d) {
    int i;
        /* starting point of the program part to be protected */
    #pragma start
        /* definition of the possible scenarios (optional) */
    #pragma race 0 x != 1
    #pragma race 1 x == 1
        for(i=0; i<3; i++) {
            /* tells cfprotect that this loop has 3 turns */
        #pragma loop 3
        #pragma flag
            action1(d);
        }
        /* all the race must pass here, the flags are automatically numbered */
    #pragma flag
        if (x == 1) {
            action2(d);
        }
        /* verification of the stack consistency, i.e. that the stack of flags
```

```
            is consistent regarding the control flow of the program */
#pragma verify
}
void action2(int d) {
    /* the race 1 must pass here and race 0 must not */
#pragma flag !0 1
#pragma verify
    action21(d);
    action22(d);
}
The following code is output from the precompiler:
/****************************************************************/
#ifdef CONTROL_FLOW_PROTECTION
#ifndef CONTROL_FLOW_PROTECTION_HEADER
#define CONTROL_FLOW_PROTECTION_HEADER
#include <string.h>
char __control_flow_stack[8];
char __cf_stack__index=0;
char __cf_race_flags=0;
char __fcPath0[ ] = {2, 3, 3, 3, 4, 0};
char __fcPath1[ ] = {2, 3, 3, 3, 4, 1, 0};
#define __cfSET_RACE(x) __cf_race_flags |= x
#define __cfRACE(x) __cf_race_flags & x
#define __cfNORACE ! (__cf_race_flags)
#define __cfPUSH(x) __control_flow_stack[__cf_stack_index]=x, __cf_stack_index++
#define __cfRESET(x) __control_flow_stack[0]=x, __cf_stack_index=1, __cf_race_flags=0
#define __cfVERIFY(p) strcmp(__control_flow_stack,p)==0
#define __cfERROR printf("control flow error detected\n")
#endif
#endif
/****************************************************************/
int f (int x, int d) {
    int i;
    /* starting point of the program part to be protected */
#ifdef CONTROL_FLOW_PROTECTION
__cfRESET(2);
#endif
    /* definition of the possible scenarios (optional) */
#ifdef CONTROL_FLOW_PROTECTION
if (x != 1) __cfSET_RACE(1);
#endif
#ifdef CONTROL_FLOW_PROTECTION
if (x == 1) __cfSET_RACE(2);
#endif
    for(i=0; i<3; i++) {
        /* tells cfprotect that this loop has 3 turns */
#pragma loop 3
#ifdef CONTROL_FLOW_PROTECTION
__cfPUSH(3);
#endif
        action1(d);
    }
    /* all the race must pass here, the flags are automatically numbered */
#ifdef CONTROL_FLOW_PROTECTION
__cfPUSH(4);
#endif
    if (x == 1) {
        action2 (d);
    }
    /* verification of the stack consistency, i.e. that the stack of flags
        is consistent regarding the control flow of the program */
#ifdef CONTROL_FLOW_PROTECTION
__control_flow_stack[__cf_stack_index]=0;
    if (!(((__cfNORACE && (__cfVERIFY(__fcPath0) || __cfVERIFY(__fcPath1))) ||
         ((!(__cfRACE(1)) || (__cfVERIFY(__fcPath0))) &&
            (!(__cfRACE(2)) || (__cfVERIFY(__fcPath1))))))
        { __cfERROR; }
#endif
}
void action2 (int d) {
    /* the race 1 must pass here and race 0 must not */
#ifdef CONTROL_FLOW_PROTECTION
__cfPUSH(1);
#endif
#ifdef CONTROL_FLOW_PROTECTION
    __control_flow_stack[__cf_stack_index]=0;
    if (!(((__cfNORACE && (__cfVERIFY(__fcPath1))) ||
         ((!(__cfRACE(1)) &&
            (!(__cfRACE(2)) || (__cfVERIFY(__fcPath1))))))))
```

-continued

```
        { _cfERROR; }
#endif
    action21(d);
    action22(d);
}
```

The precompiler defines the data structures used for the check. These data structures can be divided into two types: static and dynamic. The dynamic data structures are as follows:
1. A byte array which will store the stack of beacons crossed successively as the program is executed.
2. A byte indicating the stack size.
3. A byte designating the permissible path families.

```
        char _control_flow_stack[8];
        char _cf_stack_index=0;
        char _cf_race_flags=0;
```

The static data describes the permissible beacon stacks; in our case:

```
        char _fcPath0[ ] = {2, 3, 3, 3, 4, 0};
        char _fcPath1[ ] = {2, 3, 3, 3, 4, 1, 0};
```

Figure 2:
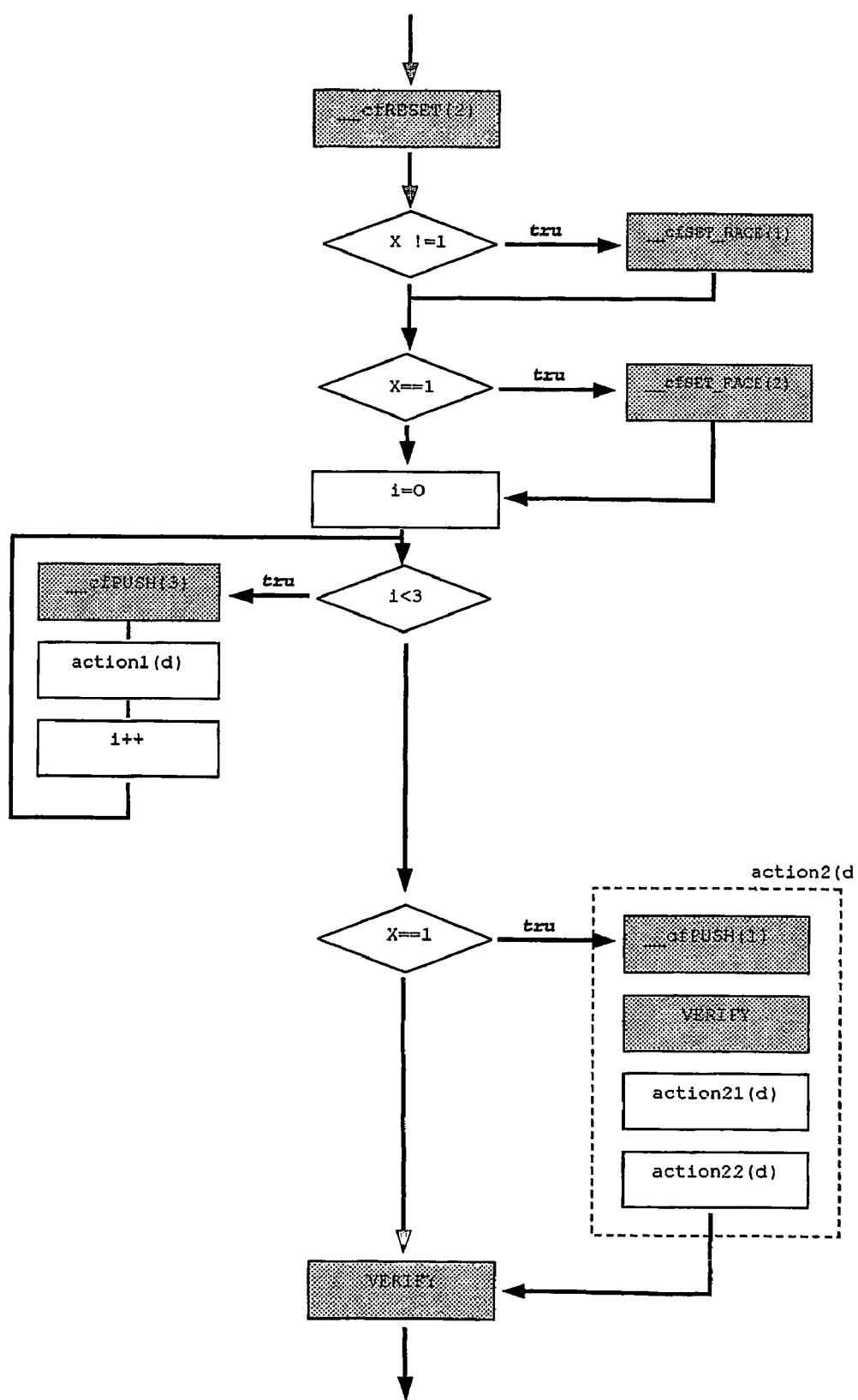
FIG. 2 shows a graph representing the steps of the method according to this invention.

This data is calculated by the preprocessor using the control flow graph of the program, also calculated by the preprocessor (see FIG. 2). Analysis of this graph indicates which beacon series correspond to execution leading from a reset beacon to a verification beacon.

The precompiler also defines a set of functions, C macros in fact, used during the beacon passages. These functions are as follows:

7. _cfERROR indicates the procedure to be executed in case of error detection.

The following functions are used to implant the error detection:
   A directive start is replaced by a reset beacon encoded by _cfRESET(x) where x is the symbol allocated to the beacon concerned.
   A directive flag . . . is replaced by a beacon encoded by _cfPUSH(x) where x is the symbol allocated to the beacon concerned.
   A directive race n cond is replaced by if (cond)_cfSET_RACE(x) where x encodes the family n of execution.
   A directive verify is replaced by a test, specific to the point of the program where it is located, which checks that the stack of beacons corresponds to a permissible execution, in view of the families activated. This check is based in particular on the static data calculated by the preprocessor.
   The directives loop n are used by the precompiler only, which removes them after its calculation.

In the example proposed, the checks are carried out at the end of function f and in function action2. The arrays _fcPath0 and _fcPath1 define the permissible executions. There are two execution families, the first consists of _fcPath0 and the second of _fcPath1. _fcPath0 corresponds to the execution which does not pass by the call of action2(d); _fcPath1 corresponds to the execution which passes by the call of action2(d).

If a check fails, this means that the stack representing the beacons crossed successively does not agree with the control

```
#define _cfSET_RACE(x) _cf_race_flags |= x
#define _cfRACE(x) _cf_race_flags & x
#define _cfNORACE !(_cf_race_flags)
#define _cfPUSH(x) _control_flow_stack[_cf_stack_index]=x,_cf_stack_index++
#define _cfRESET(x) _control_flow_stack[0]=x,_cf_stack_index=1,_cf_race_flags=0
#define _cfVERIFY(p) strcmp(_control_flow stack,p)==0
#define _cfERROR printf("control flow error detected\n")
```

1. _cfSET_RACE(x) is used to indicate that the execution family encoded by x is permissible.
2. _cfRACE(x) tests whether the family encoded by x has actually been activated, in this case only the executions of this family are permitted.
3. _cfNORACE indicates that no families have been activated, in this case all executions consistent with the control flow graph are permissible.
4. _cfPUSH(x) pushes the beacon x onto the stack; the precompiler assigns a unique identifier to each start or flag beacon.
5. _cfRESET(x) empties the stack of beacons.
6. _cfVERIFY(p) compares the stack of beacons with an array representing a permissible stack (one of the precalculated static arrays).

flow graph of the program. We can deduce that an error has been injected during execution.

The securing method is remarkable in that the functions implemented in the calculation are modified by adding in several positions and automatically:
1. Static information generated by the automatic process.
2. A dynamic part of the memory of the electronic system allocated by the automatic process.
3. Beacons and check points to mark out the code, introduced by the automatic process.
4. Beacon functions storing information in the dynamic memory.
5. History verification functions using the static information and the dynamic memory to check that no errors have been introduced.

The invention claimed is:

1. A method to secure the execution of at least one program in an electronic assembly comprising information processing means and information storage means, comprising inserting directives, corresponding to beacons and beacon functions intended for a pre-processor, into the code of the program;

causing the pre-processor to replace at least one directive by a beacon determined to correspond to the directive, in the code of the program;

during the execution of said program, causing the electronic assembly to:

store one or more items of information concerning one or more characteristics of at least one beacon during the passage of said beacon and check, at at least one check point, the consistency of the information stored about all beacons encountered.

2. An electronic assembly including information processing means and information storage means containing at least one program to be executed wherein the electronic assembly comprises:

the means required to insert directives, corresponding to beacons and beacon functions intended for a pre-processor, into the code of the at least one program;

the means required to cause the pre-processor to replace at least one directive by a beacon determined to correspond to the directive, in the code of the program;

the means required, during the execution of said program, and during the passage by at least one beacon, to store one or more items of information concerning one or more characteristics of said beacon in said storage means and means to check, at at least one check point, the consistency of the information stored about all beacons encountered.

3. A computer executable storage medium having a computer executable program code embodied therein, said computer executable program code adapted to be executed to secure the execution of at least one program in an electronic assembly having information processing means and information storage means, said executable program code comprising instructions to direct a microprocessor of the electronic assembly to:

cause a pre-processor to replace at least one directive inserted into a program, the at least one directive corresponding to beacon and beacon functions, and intended for the pre-processor, by a determined beacon in the code of the program; and during the execution of said program:

store one or more items of information concerning one or more characteristics of at least one beacon during the passage by said beacon and check at, at least one check point, the consistency of the information stored about all beacons encountered.

4. A computer readable storage medium having a computer executable program code embodied therein, said computer executable program code adapted to be executed to secure the execution of at least one program in an electronic assembly having information processing means and information storage means, said executable program code comprising instructions to direct a microprocessor of the electronic assembly to:

to replace directives inserted into a program, the directives corresponding to beacon and beacon functions, by a set of static data, beacon functions and verification functions to automatically integrate a set of valid executions represented by the static data, the beacon functions being used for calculating dynamically a representation of the execution; and the verification functions being used to check the consistency of the static and dynamic data.

5. The computer executable storage medium of claim 4 wherein the medium further comprises instructions to direct a microprocessor of the electronic assembly to use a control flow graph of the program to be protected to generate the static information used by the verification functions.

6. The computer executable storage medium of claim 4 or 5 wherein a beacon is information which defines the characteristics of a corresponding passage point and/or one or more other passage points.

7. The computer executable storage medium of claim 6 wherein the beacon is one of the following elements, a combination of several of them, or all of them:

an integer locating the beacon in the code to be protected;

a Boolean variable defining whether the beacon is the first or the last beacon;

a data structure characterizing, according to the value of a register or a given variable, all beacons through which passage will be forbidden in the remaining execution;

a data structure comprising, according to the value of a register or a given variable, all beacons through which passage will be forced in the remaining execution.

8. The computer readable storage medium of claim 4 wherein the beacon function is called by the program at each passage by a beacon and which will consist in storing dynamically in a shared memory various items of information concerning the beacon.

9. A method to secure at least one program designed to be integrated in an electronic assembly including information processing means and information storage means, comprising inserting directives, corresponding to beacons and beacon functions, and intended for a pre-processor, into the code of the program;

causing the pre-processor to replace the directives in the code of the program by a set of static data, beacon functions and verification functions to automatically integrate a set of valid executions represented by the static data, the beacon functions being used for calculating dynamically a representation of the execution and the verification functions being used to check the consistency of the static and dynamic data.

10. The method according to claim 9, wherein the electronic assembly uses a control flow graph of the program to be protected to generate the static information used by the verification functions.

11. The method according to claim 9 or 10, wherein a beacon is information which defines the characteristics of a corresponding passage point and/or one or more other passage points.

12. The method according to claim 11, wherein the beacon is one of the following elements, a combination of several of them, or all of them:

an integer locating the beacon in the code to be protected;

a Boolean variable defining whether the beacon is the first or the last beacon;

a data structure characterizing, according to the value of a register or a given variable, all beacons through which passage will be forbidden in the remaining execution;

a data structure comprising, according to the value of a register or a given variable, all beacons through which passage will be forced in the remaining execution.

13. The method according to claims 9 or 10, wherein a beacon function is called by the program at each passage by a beacon and which consists in storing dynamically in a shared memory various items of information concerning the beacon.

14. The method according to claim 13, wherein the beacon function pushes the beacon onto a stack in the shared memory and/or one which updates a checksum contained in the shared memory with the beacon data.

15. The method according to one of claims 9 or 10, further comprising calling a history verification function at each check point to check the consistency of the information stored in a shared memory during the successive calls of the beacon functions.

* * * * *